United States Patent [19]

Meissner

[11] Patent Number: 5,114,024
[45] Date of Patent: May 19, 1992

[54] FLOATING CATWALK FOR STORAGE RACKS

[75] Inventor: Ernest H. Meissner, Bernardsville, N.J.

[73] Assignee: Vital Records Inc, Flagtown, N.J.

[21] Appl. No.: 578,463

[22] Filed: Sep. 7, 1990

[51] Int. Cl.⁵ ............................................. A47F 5/00
[52] U.S. Cl. .................................. 211/175; 211/162; 312/201
[58] Field of Search .................. 211/175, 162, 151; 414/331, 281; 104/106, 288; 108/48, 143; 312/201

[56] References Cited

U.S. PATENT DOCUMENTS 4,307,922 12/1981 Rhodes, Jr. ...................... 312/201 X
4,453,641 6/1984 Rasmussen et al. ................. 211/151
4,615,449 10/1986 Naito et al. ........................... 211/162

Primary Examiner—Blair M. Johnson
Attorney, Agent, or Firm—J. D. Kaufmann

[57] ABSTRACT

A modular storage system permits access to elevated shelves. A plurality of multishelved racks are movable together and apart on rollers or wheels in a room. Each rack includes a number of shelf stacks. Side-by-side stacks are interconnected so that the rack extends in a direction perpendicular to its direction of movement. Supported by wall of the room are plural catwalks which pass between adjacent shelves of each stack in each rack. The catwalks permit a person standing thereon to gain access to shelves above the catwalk. Selected racks may include facilities for supporting the catwalks without hindering rack movement.

3 Claims, 3 Drawing Sheets

FLOATING CATWALK FOR STORAGE RACKS

BACKGROUND OF THE INVENTION

It is well recognized by those who are engaged in business requiring the maintenance of records that the storage of records is an expensive proposition. Many businesses are required to retain both active records and archival records. In either case cost reduction dictates that record storage be accomplished subject to the maximum utilization of storage space. Many record storage structures have been devised to achieve this goal. Among these are the accordion type record storage structures, wherein storage capacity is increased by utilizing horizontally displaceable, vertically extending storage racks. In such structures, the vertical storage racks are displaceable such as to create selective access aisles, thereby reducing the amount of dedicated aisle space and increasing the efficiency of the storage facility.

Although such accordion type record storage structures have been utilized with success, their structure often has resulted in an operational limit in their effectiveness. More specifically, traditional accordion style storage structures comprise a plurality of vertically extending storage racks. Each storage rack is mounted such as to horizontally displaceable. As respective racks are displaced, aisles are defined between the respective racks to provide access to records. Similarly, as vertical racks are displaced horizontally, those vertical racks between which access is not sought, are disposed in surface-to-surface contact.

As is often the case, the vertical space available in record storage areas is in excess of six feet, i.e. the typical height of storage racks to provide access without use of a ladder. The recognized approach to utilization of the space under such violations is to utilize a ladder which may be selectively positioned between racks when high access is required.

Needless to say, the continued transport of a ladder, opening this ladder, using this ladder, closing the ladder and removing it so that vertical record racks may be displaced to generate different access aisles, constitute inefficient, costly approaches to gaining access to high rack storage areas.

Accordingly, there has existed a need for some form of permanently installed means for gaining access to high storage racks which does not interfere with the operation, i.e., horizontal movement of the vertical racks. Prior to the present invention, none has existed.

SUMMARY OF THE INVENTION

It is an object of the present invention, therefore, to provide a multi-unit storage system with personnel access means such as to permit access to high level racks.

A further object of the present invention is to provide a multi-unit storage system with permanently installed means to provide access to high level racks without interfering with the operation of the racks.

These objects and others not enumerated are achieved by a storage system according to the present invention, one embodiment of which may include a plurality of spaced storage racks which extend from a base support level to a top level, the storage racks being movably supported by bearings so as to permit horizontal movement of the storage racks, and a personnel access means disposed intermediate the top and bottom of the racks, the personnel access means being defined by a catwalk secured at a position vertically intermediate the storage racks and extending therethrough such as to not interfere with horizontal movement of the racks during operation.

BRIEF DESCRIPTION OF DRAWINGS

A more complete understanding of the present invention may be had from the following detailed description, particularly when read in the light of the accompanying drawings, wherein.

DETAILED DESCRIPTION

Figure 1:
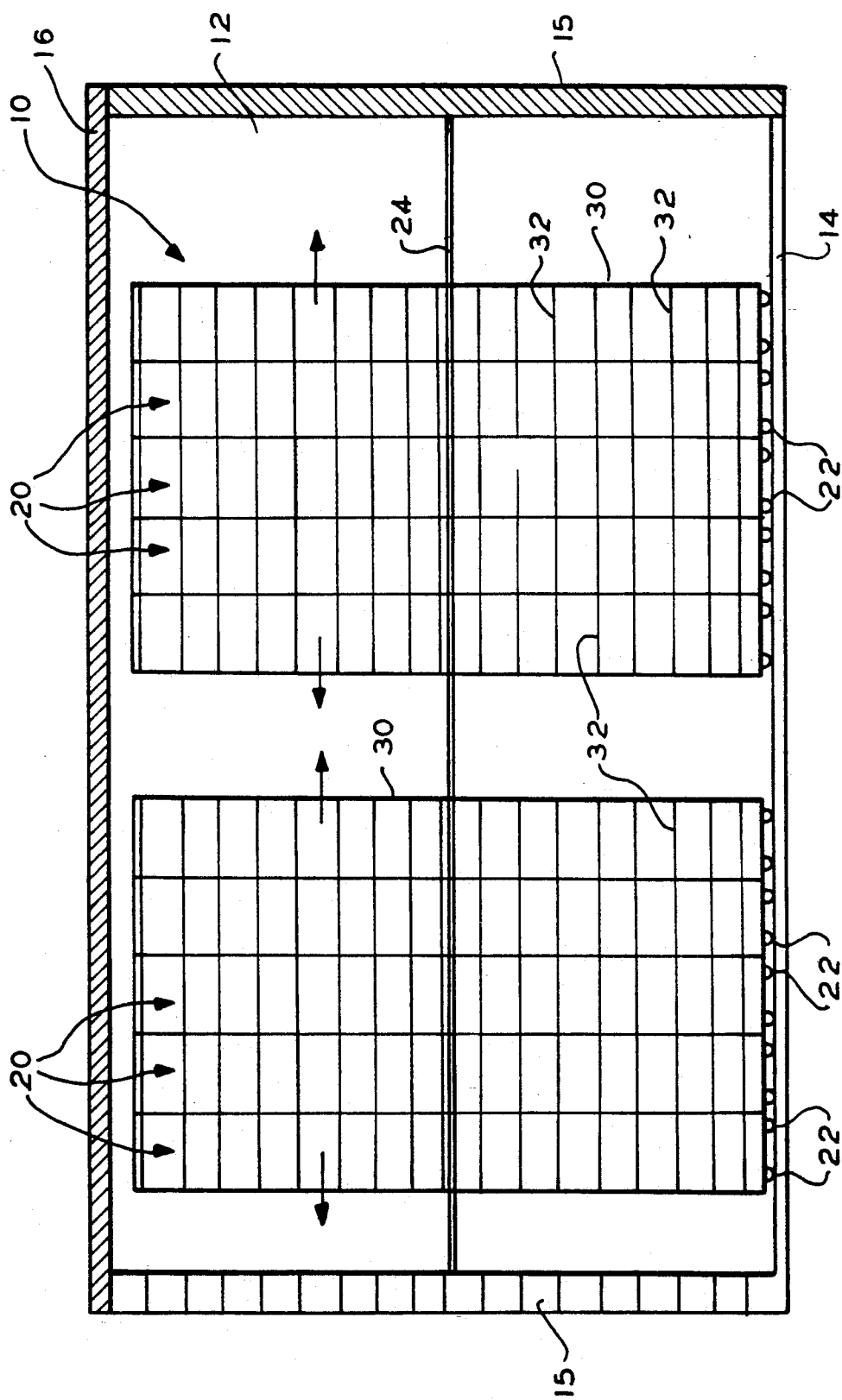
FIG. 1 is an elevational view, partly in section, of a storage system according to the present invention installed in a room.

Referring to FIG. 1, there is shown a modular storage system according to the present invention and designated generally by the reference numeral 10. System 10 is shown mounted in a room 12 defined by a floor 14, walls 15 (only two shown) and a ceiling 16.

System 10 can be seen to comprise a plurality of racks 20. Each rack 20 extends horizontally from front to back as seen in FIG. 1 and adjacent racks 20 are spaced horizontally across room 12 between walls 15 as seen in FIG. 1. Each rack 20 may be provided with vertically spaced shelving 32 in the known manner, such shelving 32 being suitable to accommodate storage of whatever commodity is desired to be stored.

The racks 20 are mounted on bearing means 22 which provide support from floor 14 and also permit side-to-side horizontal displacement of the racks 20 during their operation. Thus, individual racks 20 may be rolled from side-to-side to create aisle space therebetween such as to permit personnel access to the individual shelves 32. The rack and bearing support structures 22 are well known in these arts and no detailed description of their structure or operation is deemed necessary.

The present invention, however, deals with utilization of such modular storage systems 10 in relatively high rooms. Thus, if the vertical distance between floor 14 and ceiling 16 of room 12 is in excess of eight feet, or in the installation shown approximately sixteen feet, some means must be provided to permit personnel access to the upper shelves 32.

In system 10 such personnel access is provided by a permanently installed catwalk system. In the embodiment of FIG. 1, the catwalk system comprises a plurality of catwalk elements 24 which are rigidly secured at their ends to walls 15 by the use of conventional securing means.

Figure 2:
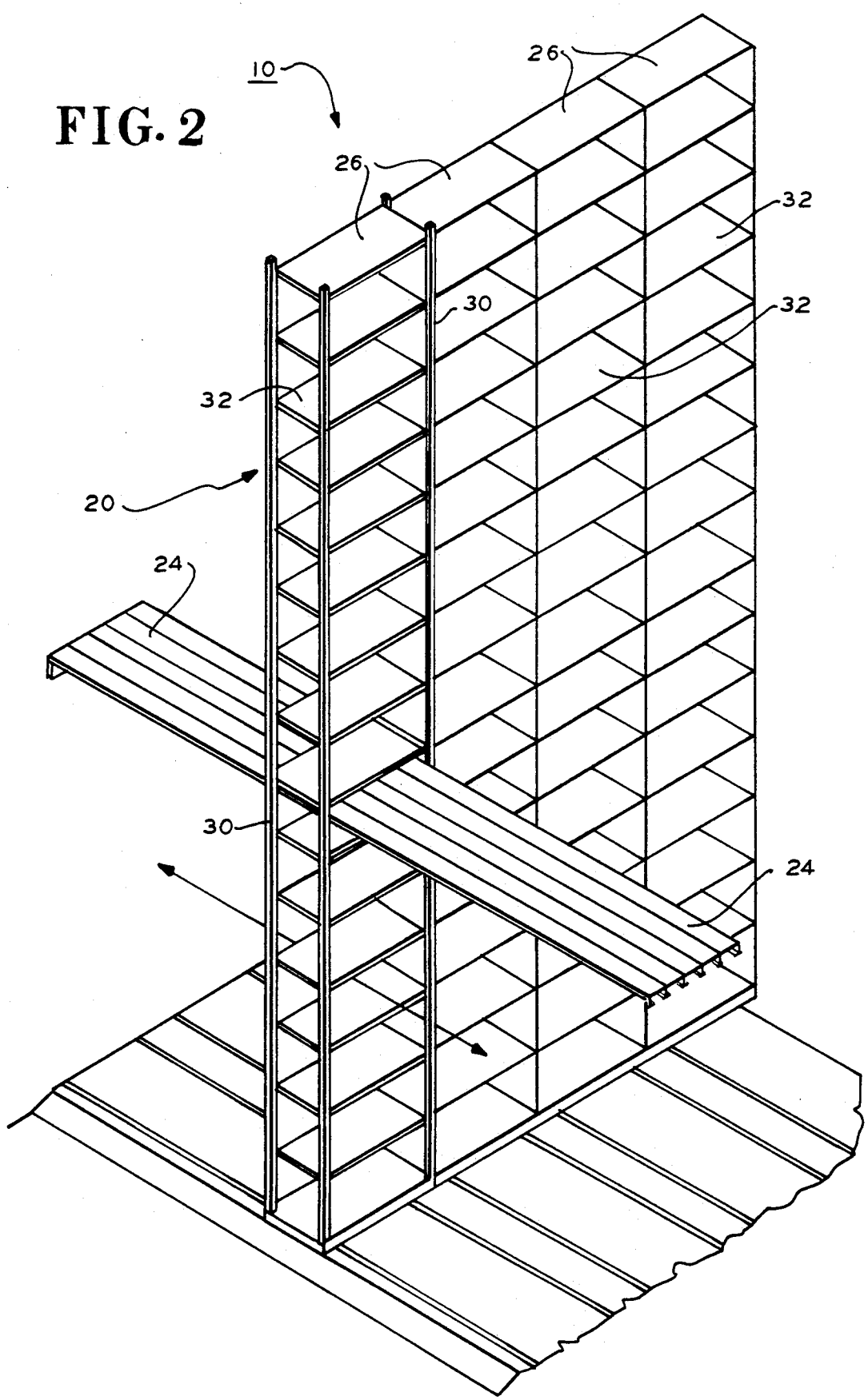
FIG. 2 is a partial perspective view of elements of a storage system according to the present invention.
Figure 3:
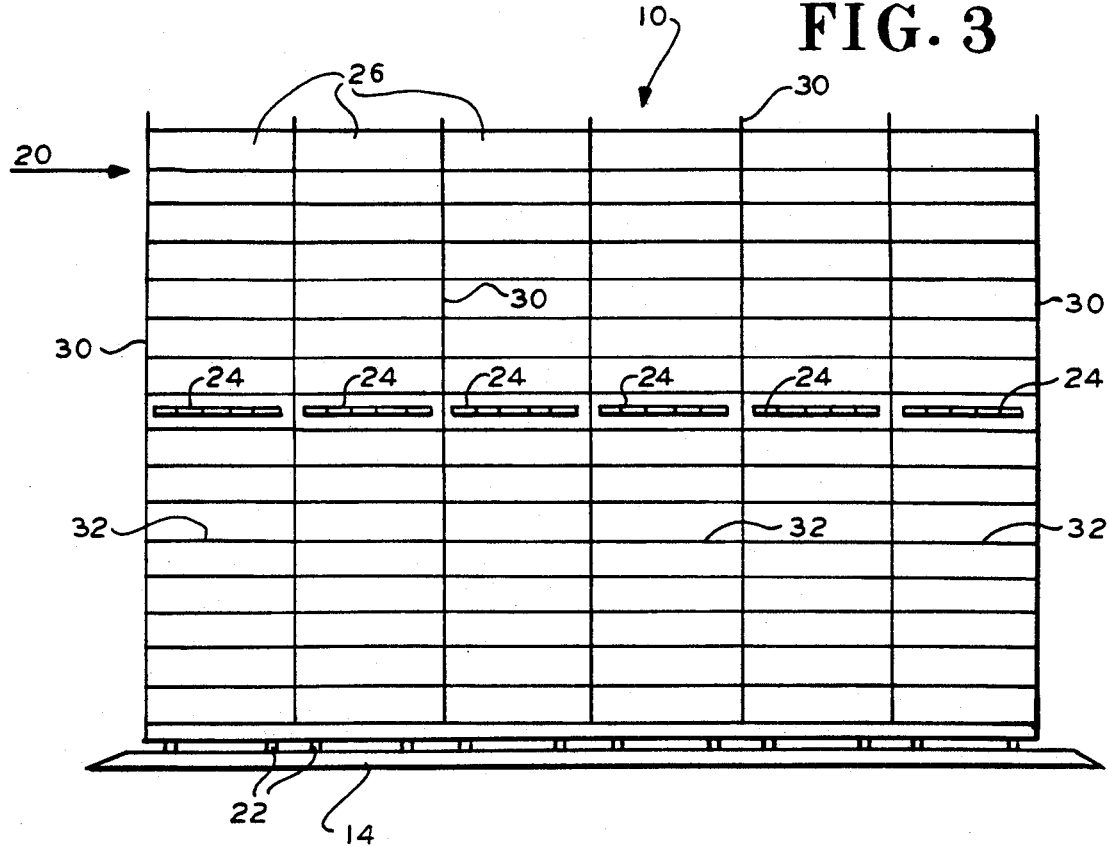
FIG. 3 is an elevated end view of storage system according to the present invention.

Referring to FIG. 2, there is shown in perspective view a rack 20 of system 10, the rack 20 having an exemplary catwalk element 24 extending therethrough. More specifically, each rack 20 can be seen to comprise a plurality of horizontally spaced vertically extending shelf stacks or modules 26 which are secured together in side-by-side relationship. Catwalk element 24, secured at its ends to walls 15 as shown in FIG. 1, extends through the opening defined by the shelves 32 and supports 30 of the stacks or modules 26. Thus, although only one catwalk element 24 is shown, the present invention contemplates that individual catwalk units 24 will be provided to extend through adjacent openings in adjacent stacks or modules 26 and similarly through aligned openings in adjacent racks 20. Further, although the catwalk elements 24 extend through the openings, they have no contact with the racks as a result of which the racks may be displaced freely in operating the storage system. Further, the plurality of catwalk elements 24 cooperate to define a planar surface which provides personnel access to the upper levels of the system racks. In this regard the cooperative catwalk elements 24 may be seen in FIG. 3 as they cooperate to define a personnel access surface.

It may be the case that the span between walls 15 may be so great as to require intermediate support for the catwalk elements 24 so as to preclude unacceptable deflection of the catwalk element 24 under load. The present invention accommodates for such an event by utilizing bearing supports on one or more of the rack frames at appropriate locations. Thus, referring to FIG. 4, a bearing arrangement is shown schematically which provides intermediate support for catwalk elements 24 without interfering with the mobility of the storage system.

Figure 4:
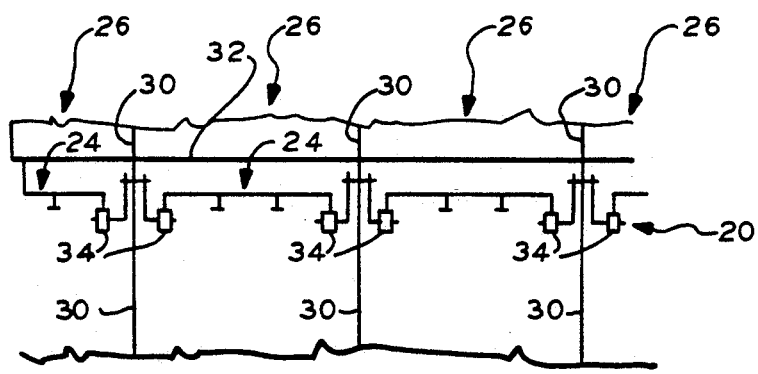
FIG. 4 is a partial schematic view of bearing support means for an additional embodiment of support systems according to the present invention.

More specifically, there is shown schematically in FIG. 4 a plurality of adjacent stack modules 26 through the openings of which extend catwalk elements 24. The catwalks 24 are shown as being located below the level of shelves 32 which are supported by vertical stanchions 30 in a conventional manner. Secured to vertical stanchions 30 are bearing members 34 which may be conventional rollers on right angle mounts such as any of those which are generally available. The upper surfaces of the rollers support the lower outer flange surfaces of the catwalk 24 thus providing support for the catwalk. As the racks may be moved during operation of the system, the catwalk elements 24 are continued to be supported and unacceptable deflection is avoided.

It can be seen, therefore, that the present invention provides a storage system which permits mobile storage racks while at the same time providing personnel access to the upper storage levels.

It will be recognized by those skilled in these arts that many modifications and variations to the preferred embodiment may be made without departing from the spirit and scope of the invention.

What is claimed is:

1. A modular storage system for use in a room, comprising:
    (a) a plurality of racks, each rack having vertical stacks of horizontal shelves supported by a plurality of vertical members, a plurality of the stacks extending along a first direction being interconnected to form the rack;
    (b) means for supporting the racks on a floor of the room for side-by-side juxtapositioning and for movement together or apart within the room along a second direction perpendicular to the first direction;
    (c) horizontal catwalks extending along the second direction, the catwalks being supportable at either end by the walls of the room, each catwalk passing between two selected vertically adjacent shelves of each stack in each rack, the catwalks providing access to shelves thereabove to a person standing thereon between adjacent racks which have been moved apart; and
    (d) means on selected racks for vertically supporting the catwalks intermediate their ends while permitting unhindered movement of the selected racks.

2. A storage system as in claim 1, wherein:
the selected shelves are generally midway between the top and bottom of the stacks.

3. A storage system as in claim 1, wherein:
the vertically supporting means comprises rollers carried by the racks, the catwalks resting on the rollers.

* * * * *